United States Patent
Yang et al.

(10) Patent No.: US 7,209,510 B2
(45) Date of Patent: Apr. 24, 2007

(54) CHANNEL ESTIMATION SYSTEM FOR A WIDEBAND CODE DIVISION MULTIPLE ACCESS (WCDMA) COMMUNICATION SYSTEM

(75) Inventors: Ganning Yang, Irvine, CA (US); Terence Yim, Rancho Santa Margarita, CA (US); John Walley, Ladera Ranch, CA (US)

(73) Assignee: Skyworks Solution, Inc., Irvine, CA (US)

( * ) Notice: Subject to any disclaimer, the term of this patent is extended or adjusted under 35 U.S.C. 154(b) by 178 days.

(21) Appl. No.: 10/895,172

(22) Filed: Jul. 20, 2004

(65) Prior Publication Data

US 2006/0018368 A1    Jan. 26, 2006

(51) Int. Cl.
*H04K 1/00* (2006.01)
(52) U.S. Cl. .................................. 375/147; 375/340
(58) Field of Classification Search .............. 375/150, 375/148, 147, 144, 346; 370/342, 335, 441, 370/320; 398/78
See application file for complete search history.

(56) References Cited

U.S. PATENT DOCUMENTS

| | | | |
|---|---|---|---|
| 5,596,607 A * | 1/1997 | Larsson et al. | 375/340 |
| 6,192,040 B1 * | 2/2001 | Jalloul et al. | 370/335 |
| 6,647,055 B2 * | 11/2003 | Kuo | 375/148 |
| 6,650,694 B1 * | 11/2003 | Brown et al. | 375/150 |
| 6,792,031 B1 * | 9/2004 | Sriram et al. | 375/147 |
| 2001/0031016 A1 * | 10/2001 | Seagraves | 375/264 |
| 2003/0095531 A1 * | 5/2003 | Soerensen et al. | 370/342 |
| 2003/0142731 A1 * | 7/2003 | Bergel | 375/147 |
| 2005/0036537 A1 * | 2/2005 | Zancho et al. | 375/148 |

FOREIGN PATENT DOCUMENTS

EP        001560388 A1 *    8/2005

OTHER PUBLICATIONS

Performance evaluation of adaptive beamforming using pilot and traffic channel in cdma2000 reverse link Sang-Hoon Lim; Jeonghwa Lee; Jongsoo Park; Vehicular Technology Conference, 2002. Proceedings. VTC 2002-Fall. 2002 IEEE 56th vol. 4, Sep. 24-28, 2002 pp. 2154-2157 vol. 4.*
Multipath CDMA channel estimation by jointly utilising pilot and traffic channels☐☐Choi, J.; Communications, IEE Proceedings-☐☐vol. 146, Issue 5, Oct. 1999 pp. 312-318.*

* cited by examiner

*Primary Examiner*—Temesghen Ghebretinsae (57) ABSTRACT

A channel estimation system is disclosed. The channel estimation system comprises a first memory element having a write function and a plurality of read functions, a pilot signal extraction element adapted to receive a first output of the first memory element, a programmable averaging element adapted to receive the output of the pilot signal extraction element, and a combiner adapted to receive a second output of the memory element and the output of the programmable averaging element, wherein the second output of the first memory element is delayed with respect to the first output of the first memory element.

26 Claims, 6 Drawing Sheets

CHANNEL ESTIMATION SYSTEM FOR A WIDEBAND CODE DIVISION MULTIPLE ACCESS (WCDMA) COMMUNICATION SYSTEM

BACKGROUND OF THE INVENTION

1. Field of the Invention

This invention relates generally to receiver circuit architecture in a wireless portable communication device. More particularly, the invention relates to channel estimation in a wideband code division multiple access (WCDMA) communication system.

2. Related Art

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

As these mobile communication systems continue to evolve, so do the operating requirements. Current and future mobile communication systems must be able to operate under diverse and harsh operating conditions. For example, current and future communication systems must be able to reliably operate in what is referred to as a "high speed" environment. A high speed environment is one in which the portable communication device is moving at a high rate of speed with respect to the base station with which it is communication. A portable communication device operating in a high speed train, where speeds approach and exceed 300 kilometers per hour (Km/h), is one example of such a high speed environment. A moving vehicle causes the signal received by the portable communication device (i.e., the handset, or mobile) to fade, whereby the signal amplitude and phase varies in time in addition to the amplitude and phase variations imposed by the modulation of the signal.

In a code division multiple access (CDMA) communication environment, a pair of pilot channels are provided so that the handset can estimate channel parameters and make corrections to the traffic channel based on the parameters of the pilot channel. Accurately characterizing the amplitude and phase reference of the pilot channel, referred to in CDMA as "channel estimation," is vital to accurately demodulate the traffic channel and increasingly important to performance under the new 3G (wideband CDMA, or WCDMA) standard. In WCDMA, two pilot channels from two diverse antennas (referred to as a "diversity" antenna system) are transmitted simultaneously. However, the complexity and delay associated with estimating the channel parameters of the pilot signal in a high speed environment makes accurately demodulating the traffic channel a resource intensive operation.

Therefore, it would be desirable to have a way to efficiently estimate the channel parameters in a WCDMA communication system.

SUMMARY

Embodiments of the invention include a system for aligning a data portion of a received signal with a pilot portion of the received signal, comprising processing the data portion in a first path, processing the pilot portion in a second path, extracting a phase reference signal from the pilot portion, and delaying the processing of the data portion to compensate for a delay imposed on the pilot portion as a result of the extracting step.

Other systems and methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Although described with particular reference to a portable communication device operating in a WCDMA-based communication environment, the channel estimation system can be implemented in any communication device employing a pilot signal for estimating communication channel parameters.

The channel estimation system can be implemented in hardware, software, or a combination of hardware and software. When implemented in hardware, the channel estimation system can be implemented using specialized hardware elements and logic. When the channel estimation system is implemented wholly or partially in software, the software portion can be stored in a memory and executed by a suitable instruction execution system (e.g., a microprocessor, a field programmable gate array, or other logic). The hardware implementation of the channel estimation system can include any or a combination of the following technologies, which are all well known in the art: discreet electronic components, a discrete logic circuit(s) having logic gates for implementing logic functions upon data signals, an application specific integrated circuit having appropriate logic gates, a programmable gate array(s) (PGA), a field programmable gate array (FPGA) etc.

The software for the channel estimation system comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
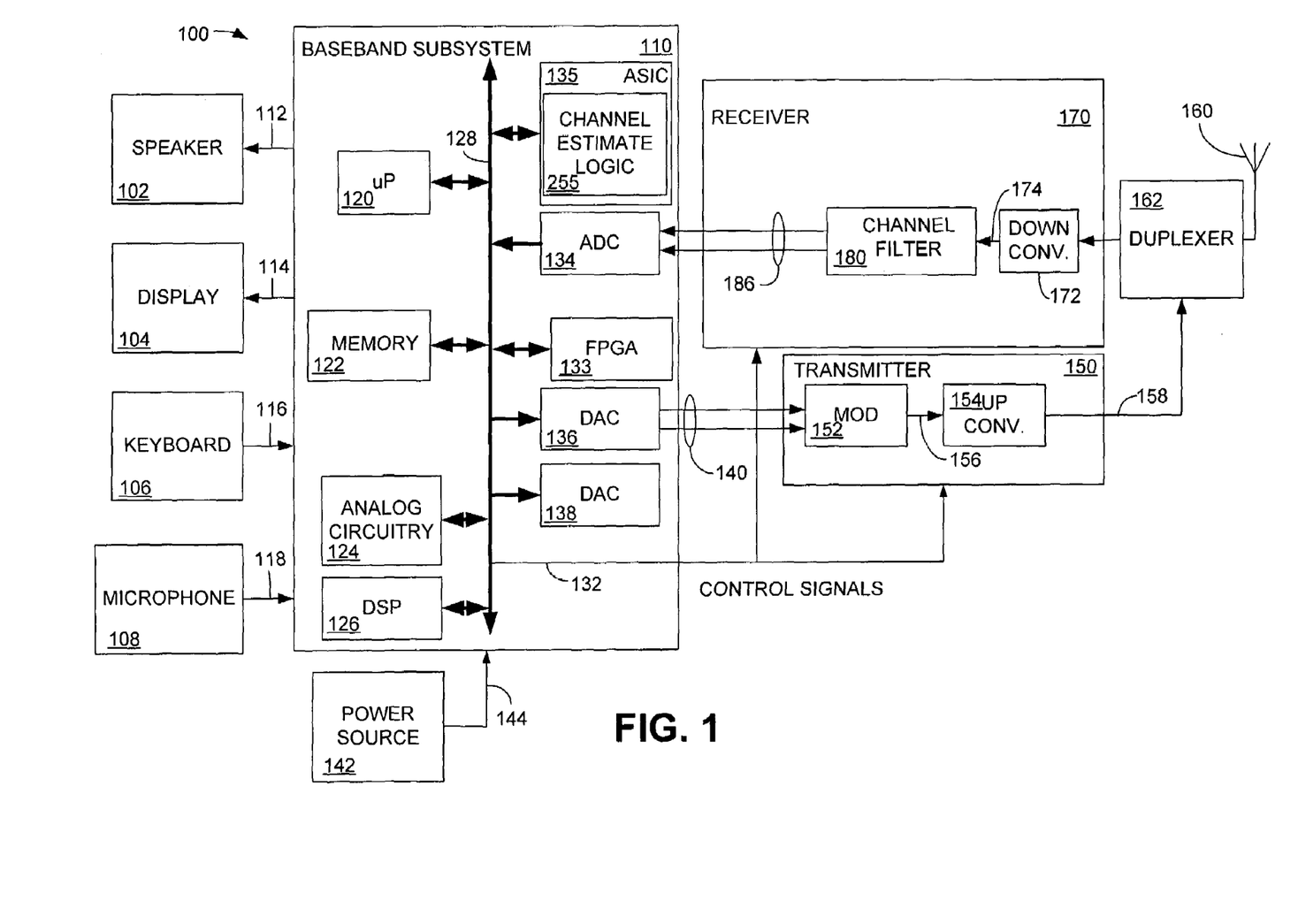
FIG. 1 is a block diagram illustrating a simplified portable transceiver including a channel estimation system in accordance with an embodiment of the invention.

FIG. 1 is a block diagram illustrating a simplified portable transceiver 100 including the channel estimation system. Portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication device such as a mobile cellular-type telephone. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (µP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the channel estimation system, to be described below, is implemented, the baseband subsystem 110 may also include an application specific integrated circuit (ASIC) 135 and a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. Baseband subsystem 110 provides control signals to transmitter 150 and receiver 170 via connection 132. Although shown as a single connection 132, the control signals may originate from the DSP 126, the ASIC 135, the FPGA 133, or from microprocessor 120, and are supplied to a variety of connections within the transmitter 150 and the receiver 170. It should be noted that, for simplicity, only the basic components of portable transceiver 100 are illustrated herein. The control signals provided by the baseband subsystem 110 control the various components within the transmitter 150 and the receiver 170.

In one embodiment, the channel estimation system is implemented using hardware, in which the channel estimation logic 255 is implemented in the ASIC 135. If portions of the channel estimation system are implemented in software that is executed by the microprocessor 120, the memory 122 typically will also include portions of the channel estimation software 255. The channel estimation software 255 comprises one or more executable logic segments that can be coded into the ASIC 135. Alternatively, the channel estimation logic 255 can be executed by the FPGA 133. Because the memory 122 can be rewritable and because the FPGA 133 is reprogrammable, updates to the channel estimation software 255 can be remotely sent to and saved in the portable transceiver 100 when implemented using either of these methodologies.

Baseband subsystem 110 also includes analog-to-digital converter (ADC) 134 and digital-to-analog converters (DACs) 136 and 138. Although DACs 136 and 138 are illustrated as separate devices, it is understood that a single digital-to-analog converter may be used that performs the function of DACs 136 and 138. ADC 134, DAC 136 and DAC 138 also communicate with microprocessor 120, memory 122, analog circuitry 124 and DSP 126 via bus 128. DAC 136 converts the digital communication information within baseband subsystem 110 into an analog signal for transmission to a modulator 152 via connection 140. Connection 140, while shown as two directed arrows, includes the information that is to be transmitted by the transmitter 150 after conversion from the digital domain to the analog domain.

The transmitter 150 includes modulator 152, which modulates the analog information on connection 140 and provides a modulated signal via connection 156 to upconverter 154. The upconverter 154 transforms and amplifies the modulated signal on connection 156 to an appropriate transmit frequency and power level for the system in which the portable transceiver 100 is designed to operate. Details of the modulator 152 and the upconverter 154 have been omitted for simplicity, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed.

The upconverter 154 supplies the upconverted signal via connection 158 to duplexer 162. The duplexer comprises a filter pair that allows simultaneous passage of both transmit signals and receive signals, as known to those having ordinary skill in the art. The transmit signal is supplied from the duplexer 162 to the antenna 160.

A signal received by antenna 160 will be directed from the duplexer 162 to the receiver 170. The receiver 170 includes a downconverter 172 and a channel filter 180. The downconverter 172 includes a low-noise amplifier (LNA) (not shown) and circuitry (not shown) to convert the received signal from an RF level to a baseband level (DC). The DC level signal is sent to the channel filter 180 via connection 174. The channel filter isolates the receive channel and supplies the received signal via connection 186 to the ADC 134. The information on connection 186 generally includes the data sought to be recovered and a pilot signal, with which the parameters of the communication channel will be estimated by the channel estimation logic 255, as will be described below. The ADC 134 converts the analog signal on connection 186 to a digital signal at baseband frequency and transfers the signal via bus 128 to various components in the baseband subsystem 110 for further processing.

Figure 2:
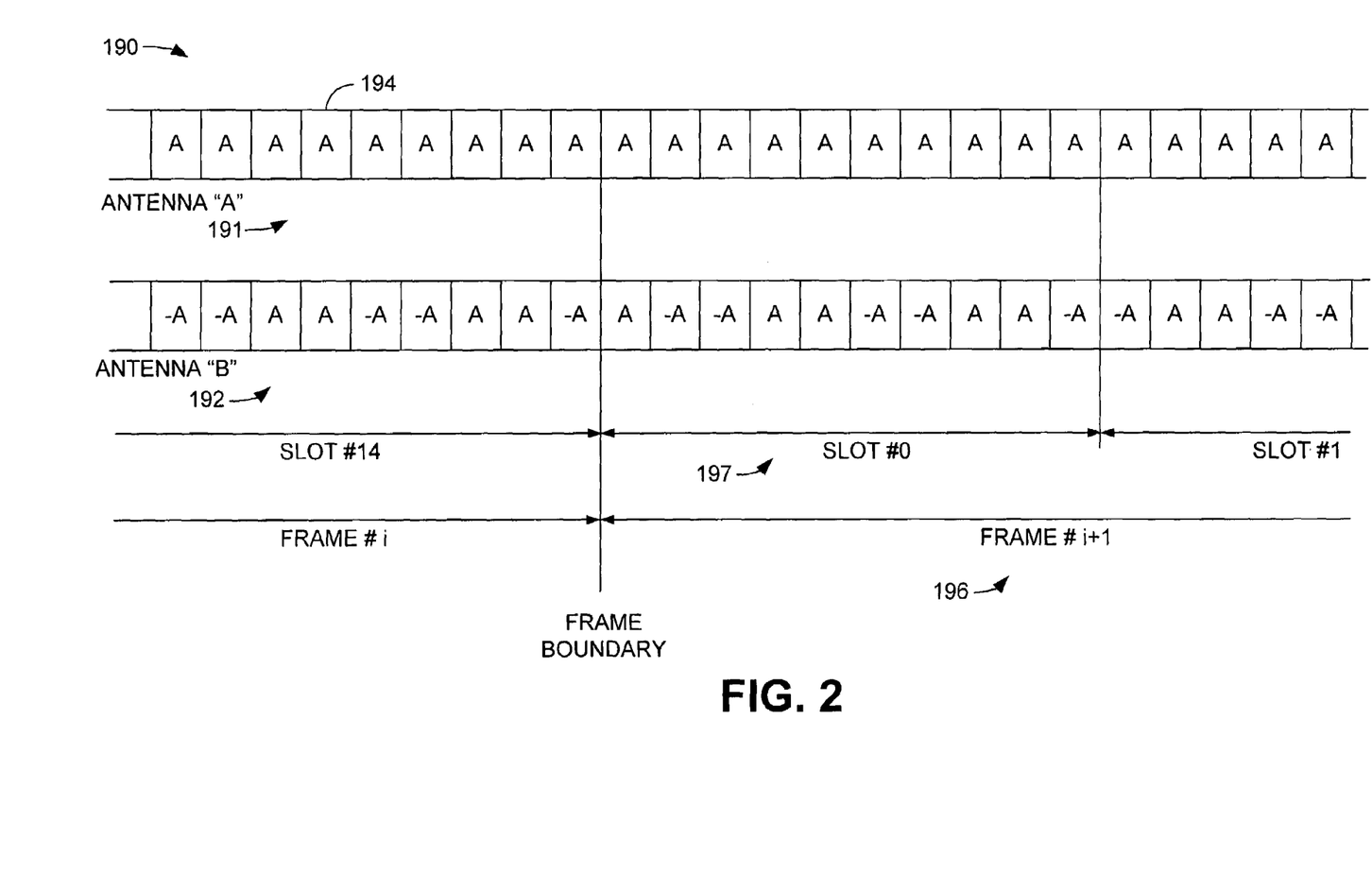
FIG. 2 is a block diagram illustrating antenna diversity.

FIG. 2 is a block diagram 190 illustrating antenna diversity. The diagram 190 includes pilot signal streams corresponding to a first antenna 191 (antenna "A") and a second antenna 192 (antenna "B"). Each signal stream comprises a plurality of symbols, an exemplary one of which is illustrated using reference numeral 194. In WCDMA, typically 10 symbols comprise each of 15 slots 197 in each frame 196. When transmit diversity is enabled, the same pilot symbols are transmitted at 15 kHz by both antennas having the polarities shown in FIG. 2. The two pilot signals are recovered by a spreading factor of 512 instead of 256, which is used for a single antenna.

Figure 3:
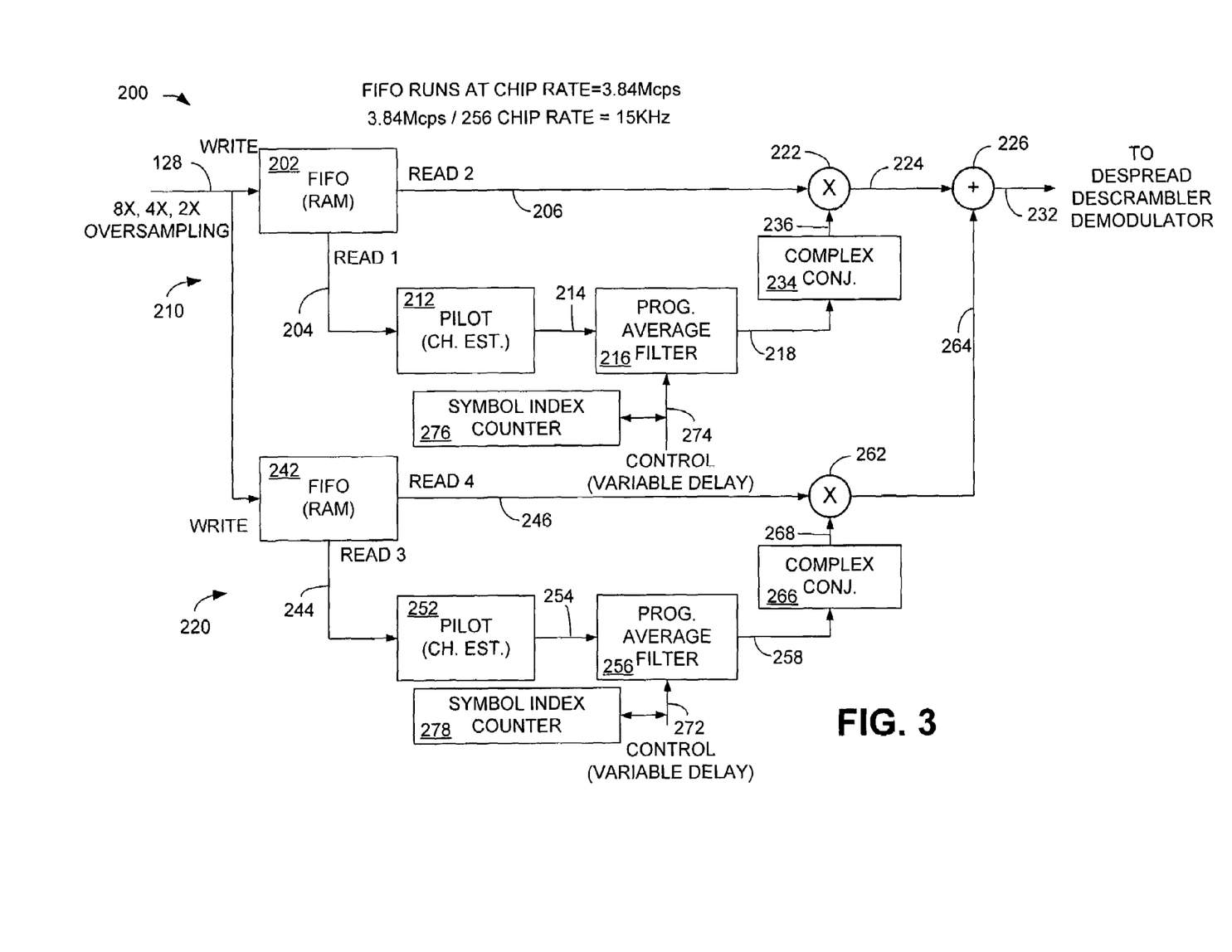
FIG. 3 is a block diagram illustrating an embodiment of the channel estimation system 200 for a first antenna "A" with or without transmit antenna diversity enabled.

FIG. 3 is a block diagram illustrating an embodiment of the channel estimation system 200 for a first antenna "A" regardless of whether transmit antenna diversity is enabled. The channel estimation system is similar for antenna B. In the example shown in FIG. 3, a two multipath signal scenario is used for convenience of illustration. The embodiment of FIG. 3 can easily be extended to applications having more than two multipath signals. The channel estimation system 200 includes a first path 210 and second path 220 (also each referred to as a "multipath") through which signals from two paths will pass.

A digital bit stream that can be, for example, oversampled by two times (2×), four times (4×), eight times (8×), of a chip rate of 3.84 Megachips per second (Mcps), is supplied via connection 128 to a random access memory (RAM) element 202 and to a RAM element 242. Although shown as two separate memory elements, the RAM elements 202 and 242 may be implemented using a single memory device.

The RAM elements 202 and 242 operate at a chip rate of 3.84 Mcps, and can have, for example, a first-in first-out (FIFO) arrangement. The received signals are downsampled and written into the RAM 202 and RAM 242 respectively. Each downsampled location for the memory elements 202 and 242 is controlled by an individual timing tracking loop (not shown in FIG. 3) for each multipath 210 and 220. Since one pilot symbol contains 256 chips in the WCDMA specification, the pilot processing path (212, 216, 234; 252, 256 and 266) equates to a signal rate of 15 kilohertz (kHz).

In accordance with an embodiment of the channel estimation system 200, the RAM elements 202 and 242 are each configured as a FIFO buffer having one write cycle and two configurable read cycles. For example, a first read cycle provides the output of the RAM 202 on connection 204 to the pilot processing element 212. The pilot processing element 212 executes the channel estimation logic 255 (FIG. 1) that performs a mathematical function on the pilot signal to recover the amplitude information and the phase reference information contained in the pilot signal. This operation is performed by despreading the signal on connection 204.

The output of the pilot processing element 212 is supplied via connection 214 to a programmable (moving) averaging filter 216. The programmable averaging filter 216 is controlled by a variable delay control signal on connection 274. When transmit antenna diversity is disabled, the programmable averaging filter 216 will maintain static characteristics and serve as a fixed filter. Therefore, with transmit antenna diversity disabled the number of averaged pilot symbols is constant and the filter group delay will be constant.

When transmit antenna diversity is enabled, the operation of the programmable averaging filter for antenna "A" is designed to have a different response based on the interference patterns from antenna "B" during operation. In the WCDMA communication system, a diversity antenna system is used to simultaneously transmit a pair of pilot signals that are orthogonal with respect to each other. When transmit antenna diversity is enabled, the same pilot symbols are transmitted by antennas "A" and "B" with the different polarities shown in FIG. 2. FIG. 2 shows that the pilot symbol pattern for antenna B is regular (i.e., has a repeating pattern {A, −A, −A, A}) except for the four symbols at the frame boundary (i.e., the last two symbols in slot #14 and the first two symbols in slot #0). By examining the symbol pattern from antenna "B," the programmable averaging filter 216, having different averaging lengths at different times, can maintain orthogonality between the signals from antenna A and antenna B. In this manner, interference from antenna B can be substantially eliminated.

The operation of the programmable averaging filters can use a symbol index counter 276 coupled to connection 274 to monitor and record frame boundaries and to control the switching co-efficients of the programmable averaging filter 216. The symbol index counter 276 ensures that the channel estimation system 200 is immunized from mutual interference from the two antennas. For example, the programmable moving average filter 216 operates to average four (4) pilot symbols all the time except during certain symbols near the frame boundary. At these symbol boundary locations, the filter uses a two (2) pilot symbol averaging mode with delay control such that the group delay in the filter 216 is always constant. The programmable averaging filter 256 similarly uses symbol index counter 278. The operation is illustrated as follows.

There are two operating scenarios for the programmable averaging filter. One scenario is that the moving averaging does not occur at a frame boundary. In this scenario, for antenna A, performing four pilot symbol moving {A, A, A, A} averaging can remove the interference from antenna B since the possible symbol patterns from antenna B are {A, −A, −A, A} or {−A, −A, A, A} or {−A, A, A, −A}, or {A, A, −A, −A}. Summation of these patterns results in zero for an ideal condition. From this it is shown that four symbol moving averaging also works in terms of interference cancellation from antenna B.

The other scenario is that the moving averaging occurs at a frame boundary. In this scenario, a four symbol moving average is not applicable at pilot symbol #0 and #2 in slot #0, where either group of {A, A, A, A} for antenna A and {A, A, −A, A} for antenna B or group of {A, A, A, A} for antenna A and {−A, A, −A, −A} for antenna B does not satisfy the orthogonal condition. To maintain proper timing alignment in this case a 2-symbol moving average is used instead of a four symbol moving average. At pilot #0, the symbol pair to be averaged is pilot symbol #8 and pilot symbol #9 in slot #14. At pilot #2, the pair to be averaged is pilot symbol #0 and pilot symbol #1 in slot #0. Simulation results show that the degradation compared to a true four symbol moving average is insignificant.

The output of the programmable averaging filter 216 on connection 218 is a channel estimate ($\hat{A}_i e^{j\hat{\theta}i}$) which estimates the amplitude and phase of the pilot channel $A_i e^{j\theta i}$. The output 224 is obtained by multiplication of input 206 and the complex conjugate of the output of the programmable averaging filter 216, which is $\alpha_k A_i e^{j\theta i} * \hat{A}_i e^{-j\hat{\theta}i} = \alpha_k A_i \hat{A}_i e^{j(\theta_i - \hat{\theta}i)} \approx \alpha_k |A_i|^2$ where ak is the composite signal of spreading signal and transmitted data. The complex conjugate is performed by element 234.

At a time delayed from the time of the first read signal (referred to as "READ 1") on connection 204, a second read signal ("READ 2") is supplied from the RAM 202 on connection 206. The output of the RAM 202 on connection 206 contains the data portion of the received signal supplied by connection 128. The data portion of the signal on connection 206 is delayed in time by an amount of time at least as large as the processing delay imposed on the pilot signal by the pilot processing element 212 and the programmable averaging filter 216, also referred to as the multipath delay. The data portion of the received signal on connection 206 is phase corrected and amplitude weighted by the channel estimate extracted from the pilot portion on connection 218, in rotator 222. The output of the rotator 222 is supplied via connection 224 to a summing element 226.

Similarly, path 220, in which the second multipath signal is processed, includes a RAM 242 having write and read characteristics similar to the RAM 202. That is, the RAM 242 provides two variably delayed read cycles for each write cycle. A first read signal (referred to as "READ 3") is issued from the RAM 242 on connection 244. The signal on connection 244 contains the pilot signal received through the second multipath 220. In a similar manner to that described above, the signal on connection 244 (i.e., the pilot signal) is supplied to pilot processing element 252, which performs a function similar to the pilot processing element 212. The output of the pilot processing element 252 is supplied on connection 254 to the programmable averaging filter 256. The output of the programmable averaging filter 256 on connection 258 is supplied to the complex conjugate element 266, which provides the complex conjugate of the estimated channel amplitude and phase reference parameters of the pilot portion of the signal through path 220, as described above with respect to path 210.

At a time delayed from the READ 3 signal supplied on connection 244, a second read signal (referred to as "READ 4") is supplied from the RAM 242 via connection 246. The signal on connection 246 contains the data portion of the received signal. The delay between the READ 3 cycle and the READ 4 cycle, is a delay substantially equal to the delay imposed on the pilot signal by the pilot processing components (i.e., the pilot processing element 252, the programmable averaging filter 256 and the complex conjugate element 266).

The data portion of the received signal is supplied via connection 246 to the rotator 262, while the complex conjugate (channel amplitude and phase reference estimation) of the pilot signal is supplied via connection 268 to the rotator 262. The signals are combined in the rotator 262 and supplied via connection 264 to the summing element 226.

The summing element 226 provides a summation function whereby the weighted multipath signals in paths 210 and 220 are combined and supplied via connection 232 to be further despread, descrambled and demodulated, which is performed by a maximal ratio combining of different multipath signals. The channel estimation system 200 provides accurate channel estimation information to be extracted from the pilot portion of the received signal, while accurately matching the data portion of the received signal with the pilot portion of the received signal in a harsh multi-path environment.

In applications using transmit antenna diversity, channel estimation for antenna B is similar to antenna A except for the pilot symbol estimation element (212 and 252 in FIG. 3). In a transmit antenna diversity application, the antenna pattern polarity for antenna B is removed by the pilot symbol estimation (the pilot processing elements 212 and 252) before being sent to the programmable averaging filter. This can be done by multiplying the polarity of the symbol pattern from antenna B after pilot symbol estimation. For example, the output of the pilot symbol estimation element is obtained by the multiplication of pilot symbol estimation and polarity of the received symbol pattern, in which "1" corresponds to "A" and "−1" corresponds to "−A". Delaying the pilot portions of different multipath signals allows the pilot symbols in the different multipath signals to be aligned. For pilot symbol estimation from antenna B, the antenna B symbol pattern is removed. For instance, {A, −A, −A, A} will be converted into {A, (−1)*(−A), (−1)*(−A), A}, i.e., {A, A, A, A} for antenna B before the signal is sent to the programmable averaging filter 216.

Figure 4:
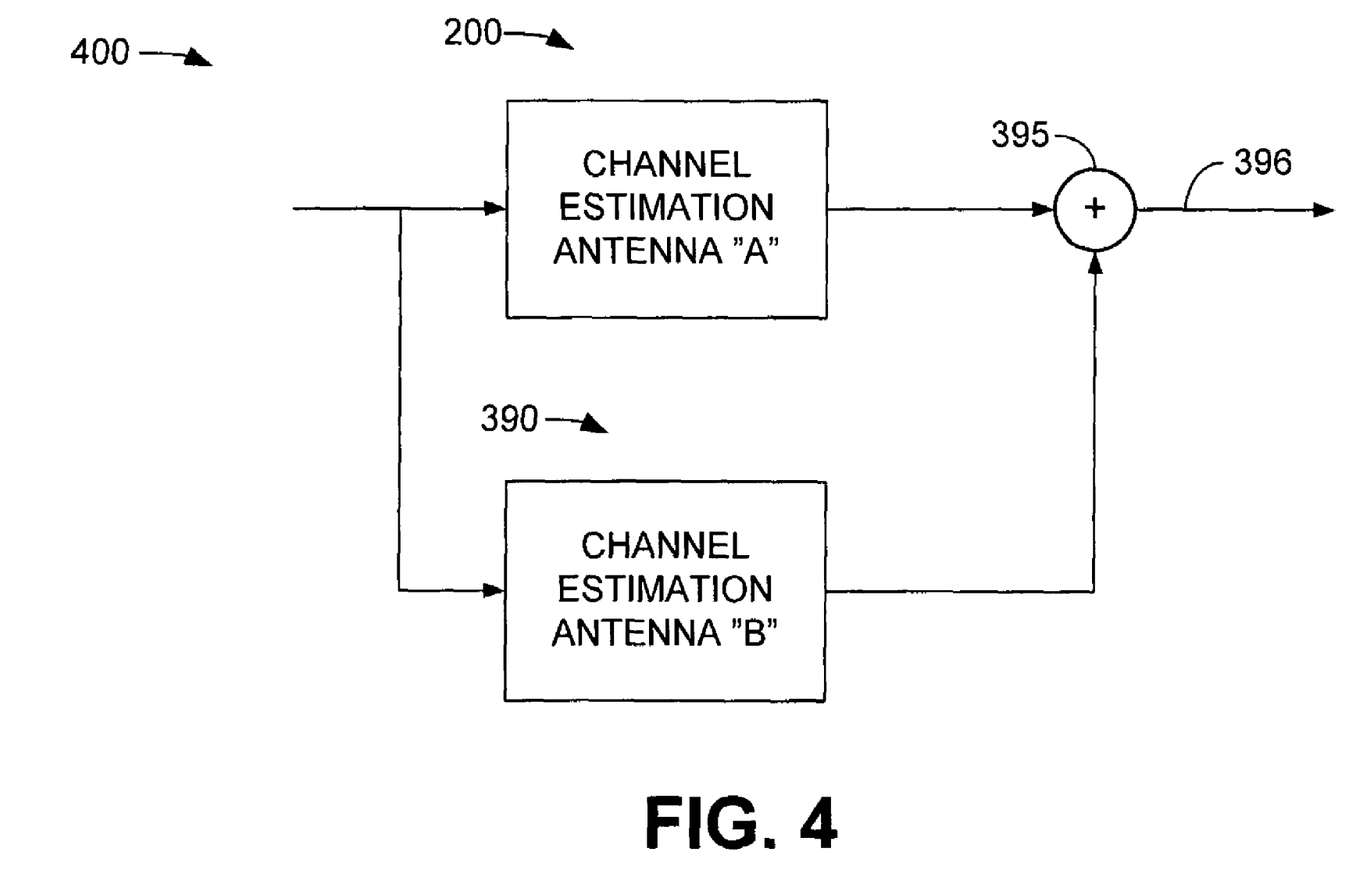
FIG. 4 is a block diagram showing the manner in which a channel estimation system for a transmit diversity antenna system is implemented.

Channel estimations for both antenna A and B are implemented by combing channel estimations for antenna A and B. FIG. 4 is a block diagram 400 showing the manner in which a channel estimation system for a transmit diversity antenna system is implemented. The output of the channel estimation system 300 (for antenna A) and the output of the channel estimation system 390 (for antenna B) are combined in adder 395 according to maximal ratio combining.

Figure 5:
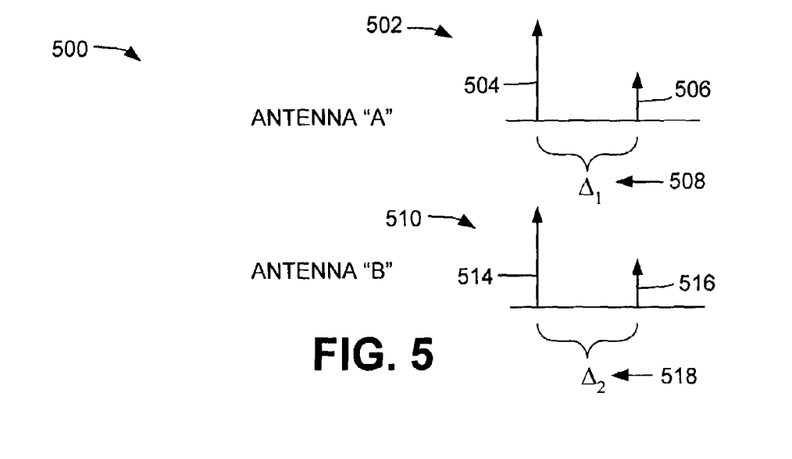
FIG. 5 is a graphical illustration showing the signals supplied from antenna A and antenna B in a two antenna diversity arrangement.

FIG. 5 is a graphical illustration 500 showing the signals supplied from antenna A and antenna B in a two antenna diversity arrangement. The delay "$\Delta_1$" 508 between a first multipath signal 504 and a second multipath signal 506 is the amount of time that the second multipath signal 506 is delayed with respect to the first multipath signal 504 as a result of the delay difference between two different radio propagation paths. Similarly, with respect to antenna B, the delay "$\Delta_2$" 518 between the first multipath signal 514 and the second multipath signal 516 is the amount of time that the second multipath signal 516 is delayed with respect to the first multipath signal 514 as a result of the delay difference between the two different radio propagation paths. Since propagation delay differences for the similar path from antenna A and antenna B are very small (typically less than ¼ chip), multipath signals 504 and 514; and 506 and 516 are nearly aligned.

Figure 6:
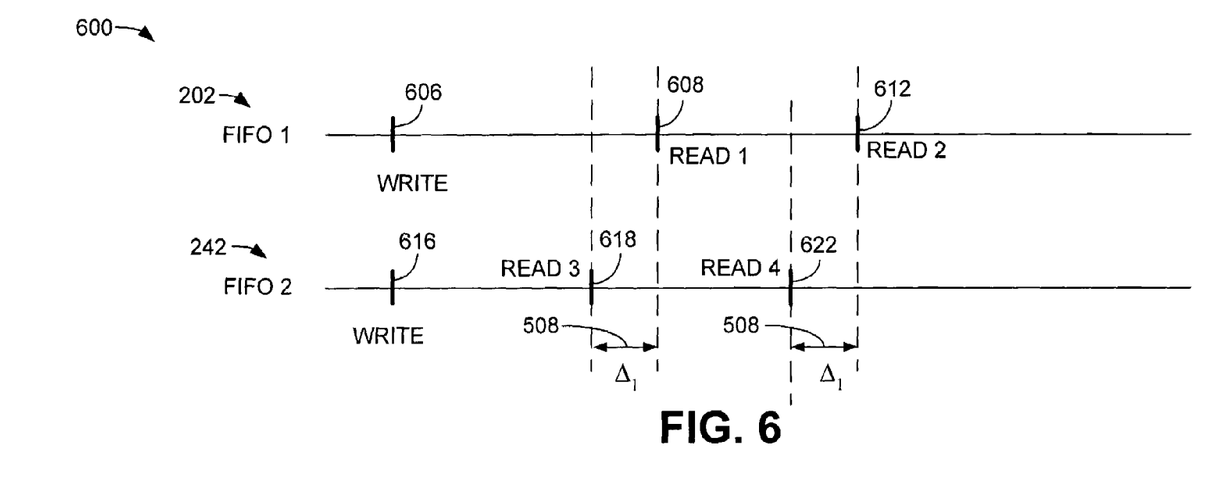
FIG. 6 is a graphical illustration showing the operation of the RAM of FIG. 3.

FIG. 6 is a graphical illustration 600 showing the operation of the RAM 202 and RAM 242 of FIG. 3. When the RAM 202 initiates a write cycle 606, a pair of read cycles (READ 1 608 and READ 2 612) follow. READ 1 608 represents a delayed version of the signal written in the RAM 202. The delay amount is at least as large as the delay spread of all the multipath signals. In this embodiment, the delay between WRITE 606 and READ 1 608 is larger than $\Delta_1$ 508. READ 2 612 represents a delayed version of the signal written in the RAM 202. The delay between READ 2 612 and READ 1 608 is substantially equal to the process delay introduced by the channel estimation element 212 and the programmable averaging filter 216. Similarly, upon write cycle 616, the RAM 242 issues two read cycles (READ 3 618 and READ 4 622). As shown, the delay between the READ 3 cycle 618 and the READ 1 cycle 608 corresponds to the $\Delta_1$ 508 between the first multipath signal and second multipath signal as described above. Similarly, the delay between the READ 4 cycle 622 and the READ 2 cycle 612 corresponds to the $\Delta_1$ 508 described above. By applying the above described methodology, i.e., an architecture having one write and two read cycles, the data portion and estimated channel portion can be aligned to compensate for channel estimation delay as well as variable multipath delays. This significantly reduces delay mismatch caused by the multipath signal spread in a conventional channel estimation system. Therefore, a portable communication device having the channel estimation system 200 provides a radio link without significant degradation in a very high speed environment.

For a WCDMA system, a four symbol moving averaging is a practical choice. Delay matching includes the despread delay (one (1) symbol) and the group delay (1.5 symbols) of the filter. For a chip-rate processing architecture, the channel phase is corrected and combined before despreading. The FIFO memory elements are used to align the chips in time before combining. The longest propagation path determines the size of the FIFO, which is up to two pilot symbols in duration according to the WCDMA standard. The total RAM count includes the FIFO and the fixed delay compensation, which can be conveniently combined into a single FIFO with a size of 4.5 symbols. This channel estimation system supports a 500 kilometer per hour (Km/hr) high speed application without significant degradation.

Figure 7:
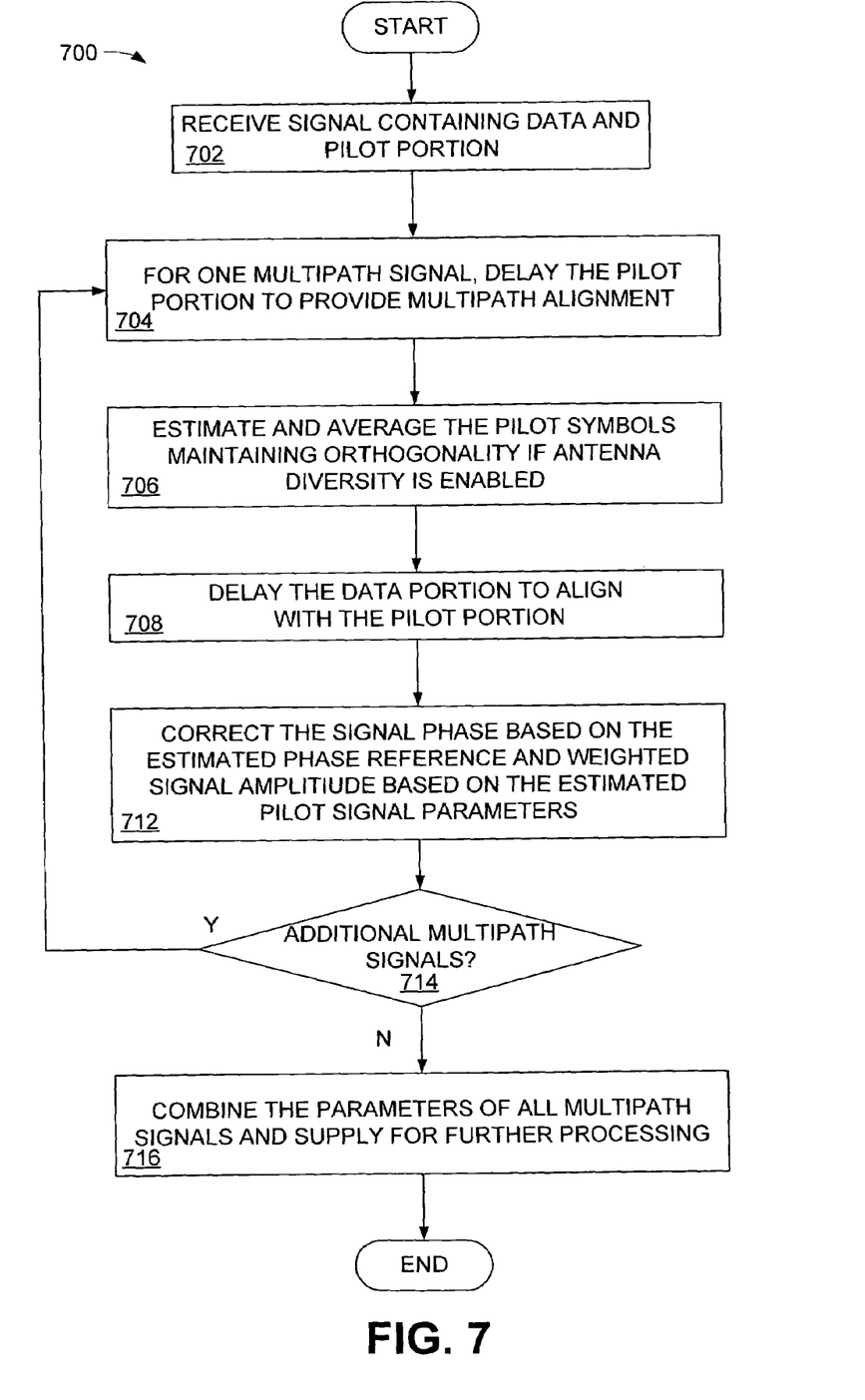
FIG. 7 is a flowchart describing the operation of an embodiment of the channel estimation system of FIG. 3.

FIG. 7 is a flowchart describing the operation of an embodiment of the channel estimation system of FIG. 3. In block 702, a receive signal having a data portion and a pilot portion is received by the channel estimation system 200. In block 704, for one multipath signal (i.e., for path 210 in FIG. 3), the pilot portion is delayed to provide multipath alignment. For example, if there are N multipaths (mp(1), . . . , mp(N)) and each multipath mp(i), where (i=2, , , N) has a delay, di, compared with the first multipath mp(1). Assume that d2<=d3 , , , <=dN. The channel estimator delays the pilot portion for the first multipath by at least the largest possible delay spread (in this case, dN) to ensure timing alignment of all the multipaths. For example, the first multipath is delayed by dmax, then other paths will be delayed as dmax-d2 for the second path, dmax-d3 for the 3rd path, . . . , and dmax-dN for the Nth path. In this manner all the mulitipath components are aligned and summed.

In block 706, the amplitude and phase reference of the pilot channel are estimated and the pilot symbols are averaged as described above. If transmit antenna diversity is enabled, then orthogonality is maintained between the two antennas. In block 708, the data portion of the signal is delayed with respect to the pilot portion to align the data portion with the pilot portion.

In block 712, the signal phase of the data portion is corrected based on the estimated phase reference and weighted amplitude of the estimated pilot channel. In block 714 it is determined whether there are any additional multipath signals to process. If there are additional multipath signals to process, the process returns to block 704. If there are no additional multipath signals to process, the process proceeds to block 716 where the parameters of all multipath signals are combined and made available for further processing.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for processing a signal, comprising:
   receiving a signal containing a data portion and a pilot portion;
   separately processing the data portion and the pilot portion;
   delaying the processing of the pilot portion by an amount of time at least as large as the multipath delay;
   processing the pilot portion to extract an amplitude and a phase reference signal, wherein processing the pilot portion further comprises:
   estimating communication channel parameters by determining a phase of the phase reference signal; and
   applying a programmable moving average to filter the pilot signal; and
   delaying the processing of the data portion by an amount of time substantially equal to a processing delay imposed on the pilot portion.

2. The method of claim 1, further comprising adjusting a programmable moving average filter.

3. The method of claim 2, wherein the programmable moving average filter is controlled by a symbol index counter.

4. The method of claim 1, wherein the delay is provided by a random access memory (RAM) configured as a first-in first-out (FIFO) memory.

5. The method of claim 4, wherein the RAM provides two read cycles for each write cycle.

6. The method of claim 1, further comprising:
   a pair of processing paths, each comprising a data processing portion and a pilot signal processing portion.

7. The method of claim 6, wherein the pair of processing paths corresponds to a pair of signal sources configured in a diversity transmission environment.

8. The method of claim 5, further comprising:
   delaying the pilot portions of different multipath signals; and
   aligning the pilot symbols in the different multipath signals.

9. A method for aligning a data portion of a received signal with a pilot portion of the received signal, comprising:
   processing the data portion in a first path;
   processing the pilot portion in a second path;
   extracting a phase reference signal from the pilot portion, wherein extracting the phase reference signal from the pilot portion further comprises:
   estimating communication channel parameters by determining a phase of the phase reference signal; and
   applying a programmable moving average to filter the pilot signal; and
   delaying the processing of the data portion to compensate for a delay imposed on the pilot portion as a result of the extracting step.

10. A system comprising:
    a first memory element having a write function and a plurality of read functions;
    a pilot signal extraction element adapted to receive a first output of the first memory element;
    a programmable averaging element adapted to receive the output of the pilot signal extraction element; and
    a combiner adapted to receive a second output of the memory element and the output of the programmable averaging element, wherein the second output of the first memory element is delayed with respect to the first output of the first memory element.

11. The system of claim 10, wherein the second output of the first memory element is delayed with respect to the first output of the first memory element by an amount of time substantially equal to a processing delay imposed on the pilot portion by the pilot signal extraction element and the programmable averaging element.

12. The system of claim 11, wherein the programmable averaging element is adjusted by a symbol index counter.

13. The system of claim 11, wherein the first memory element is a random access memory (RAM) configured as a first-in first-out (FIFO) memory.

14. The system of claim 13, wherein the RAM provides two read cycles for each write cycle.

15. The system of claim 10, wherein the pilot signal extraction element delays the pilot portions of different multipath signals to align the pilot symbols in the different multipath signals.

16. A portable transceiver, comprising:
 a receiver for receiving a signal having a data portion and a pilot portion;
 means for processing the signal, comprising:
  means for storing the signal;
  means for extracting a phase reference signal from the pilot portion,
 wherein extracting the phase reference signal from the pilot portion further comprises:
 estimating communication channel parameters by determining a phase of the phase reference signal; and
 applying a programmable moving average to filter the pilot signal; and
  means for delaying the data portion with respect to the pilot portion, the delay substantially equal to an amount of time used to process the pilot portion to extract a phase reference signal from the pilot portion.

17. The portable transceiver of claim 16, further comprising:
 means for filtering the pilot portion; and
 means for adjusting the filtering means using a symbol index counter.

18. The portable transceiver of claim 17, wherein the storing means further comprises:
 means for providing a write cycle and a plurality of read cycles, where a second read signal is delayed with respect to a first read signal.

19. The portable transceiver of claim 18, wherein the first read signal is associated with the pilot portion and the second read signal is associated with the data portion.

20. The portable transceiver of claim 19, further comprising means for determining a complex conjugate of the pilot portion.

21. The portable transceiver of claim 20, further comprising means for combining the data portion and the complex conjugate of the pilot portion.

22. The portable transceiver of claim 21, further comprising means for adding a plurality of pilot portion/data portion combinations, where the plurality of combinations corresponds to a plurality of signals.

23. The portable transceiver of claim 22, wherein the plurality of signals corresponds to a plurality of signal sources in a diversity transmission environment.

24. The portable transceiver of claim 22, wherein the data portion and the pilot portion are digital bit streams.

25. The portable transceiver of claim 21, further comprising:
 means for delaying the pilot portions of different multipath signals; and
 means for aligning the pilot symbols in the different multipath signals.

26. A method for obtaining a channel parameter estimate in a wideband code division multiple access (WCDMA) communication environment, comprising:
 receiving a combined signal including a data portion and a pilot portion;
 storing the combined signal in a memory having a write cycle and a plurality of read cycles;
 processing the pilot portion during a first read cycle;
 extracting a phase reference signal from the pilot portion, wherein extracting the phase reference signal from the pilot portion further comprises:
 estimating communication channel parameters by determining a phase of the phase reference signal; and
 applying a programmable moving average to filter the pilot signal; and
 processing the data portion during a second read cycle, wherein the second read cycle is delayed by an amount of time substantially equal to an amount of time used to process the pilot portion.

* * * * *